United States Patent [19]

Uesugi

[11] 4,288,853
[45] Sep. 8, 1981

[54] DIGITAL TEMPERATURE CONTROL SYSTEM

[75] Inventor: Michika Uesugi, Fuji, Japan

[73] Assignee: Tokyo Shibaura Denki Kabushiki Kaisha, Kawasaki, Japan

[21] Appl. No.: 61,044

[22] Filed: Jul. 26, 1979

[30] Foreign Application Priority Data

Jul. 28, 1978 [JP] Japan .................. 53-92166

[51] Int. Cl.³ ........................... G05D 23/00
[52] U.S. Cl. .................... 364/557; 165/14; 236/91 D
[58] Field of Search .......... 364/557; 236/91 R, 91 D, 236/91 F; 237/2 R, 2 A; 340/584, 585, 146.2; 73/339 R, 339 C; 165/13, 14, 26

[56] References Cited

U.S. PATENT DOCUMENTS

| | | | |
|---|---|---|---|
| 3,280,312 | 10/1966 | Sandelien | 364/557 |
| 3,692,986 | 9/1972 | Nienstaedt et al. | 364/557 |
| 4,040,565 | 8/1977 | Christiansen | 236/91 R |
| 4,071,745 | 1/1978 | Hall | 364/119 |
| 4,089,462 | 5/1978 | Bradford | 236/91 R |
| 4,108,375 | 8/1978 | Keeney | 236/91 F |

OTHER PUBLICATIONS

The TTL Data Book for Design Engineers, pp. 7-53 to 7-58; The Engineering Staff of Texas Instruments, Inc.; 1976.

Primary Examiner—Errol A. Krass
Attorney, Agent, or Firm—Oblon, Fisher, Spivak, McClelland & Maier

[57] ABSTRACT

A digital temperature control system for controlling the temperature of a space, including a thermal sensing element for supplying an analog signal proportional to temperature, an analog-to-digital converter for converting analog signals supplied by said thermal sensing element into digital signals, a plurality of switches for setting a desired temperature setting, a bit pattern-to-digital converter for converting the switch combinations into sets of digital signals, and arithmetically subtracting one least significant bit from the digital number represented by the sets of digital signals, and a digital comparator for comparing the outputs from the analog-to-digital converter with the outputs from the bit pattern-to-digital converter and for transmitting a control signal only in case the digital output from the analog-to-digital converter is greater than the digital output from the bit pattern-to-digital converter, wherein the bit pattern-to-digital converter functions as a subtractor in response to the control signal from the digital comparator, and transmits a subtracted digital signal to the digital comparator.

5 Claims, 7 Drawing Figures

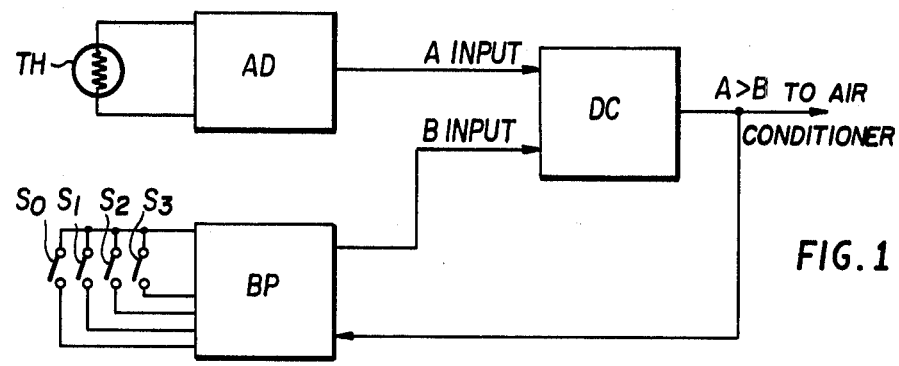
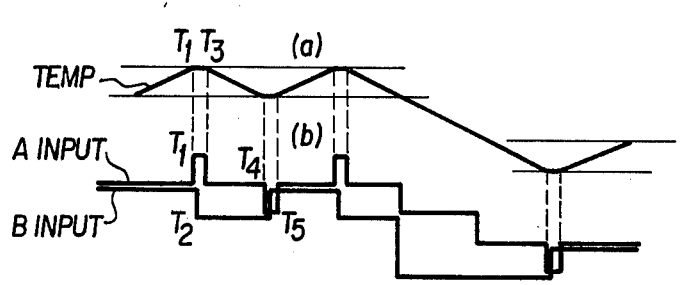
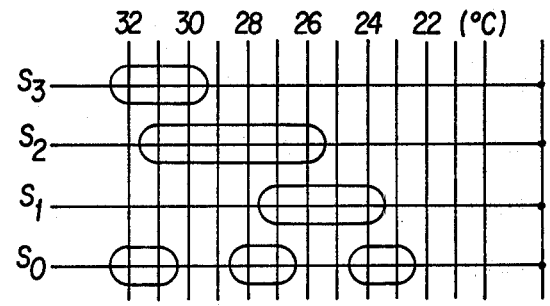
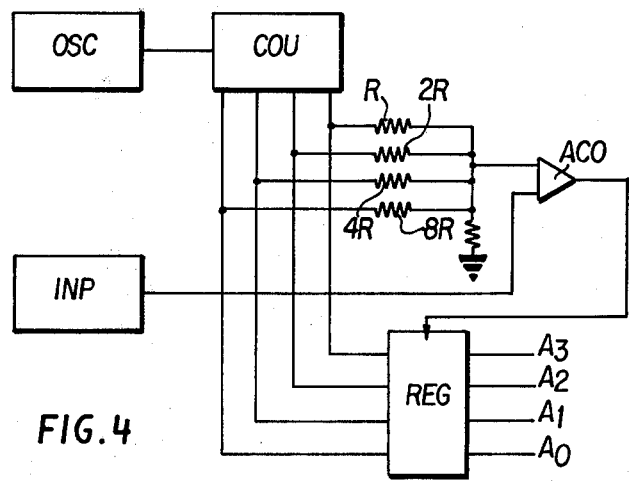
FIG. 1
FIG. 2
FIG. 3
FIG. 4

DIGITAL TEMPERATURE CONTROL SYSTEM

BACKGROUND OF THE INVENTION

1. Field of the Invention

This invention relates generally to digital temperature control systems, and more particularly a digital temperature control system employed in an air-conditioner or refrigerator which needs strict temperature control.

2. Description of the Prior Art

Heretofore, many types and methods of temperature control systems have been in use for air-conditioners and refrigerators.

These preceding temperature control systems were of the analog type operated with analog signals.

A typically conventional analog type temperature control system employs a thermister for detecting temperature and a variable resistor for adjusting the desired temperature.

An analog amplifier is also used to amplify the difference in the electric resistances of both the thermistor and the variable register in order to generate a greater control signal, and the machine, as a result, functions to decrease the difference between the present temperature and the desired temperature.

In accordance with the performance of the machine the room temperature gradually decreases until it reaches the predetermined level. The temperature undergoes fluctuations within the preset range. This conventional analog type temperature control system, however, depends to a large extent on the qualities of the elements, particularly on the quality of the variable resistor.

The variable resistor naturally deteriorates and wears out with increasing uses of the machine. In addition, there are initial deviations in its quality, thus making it impossible to correctly control the room temperature.

The degradation of the variable resistor often brings about unstable operation and a resultant malfunctioning of the machine.

SUMMARY OF THE INVENTION

Accordingly, it is a primary object of this invention, therefore, to provide a novel system of digital temperature control particularly suited for machines like air-conditioners and refrigerators Another object of the invention is to provide a digital temperature control system free from an erroneous deviation from a desired temperature.

A further object of the invention is to provide a digital temperature control system with an analog-to-digital converter which converts an analog signal into a digital signal, a bit pattern-to-digital signal converter which also functions as a subtractor only when a control signal is supplied, and a digital comparator comparing the two signals provided from both the analog-to-digital converter and the bit pattern-to-digital signal converter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a block diagram of the digital temperature control system of the present invention;

FIG. 2 is a graph of temperature-digital signal transition explaining the operation of the digital temperature control system of the present invention;

FIG. 3 is a schematic illustration of a combination of switch contacts corresponding to the desired temperatures of the present invention;

FIG. 4 is a circuit diagram of an analog-to-digital converter employed in the embodiment of the present invention shown in FIG. 1;

Figure 5:
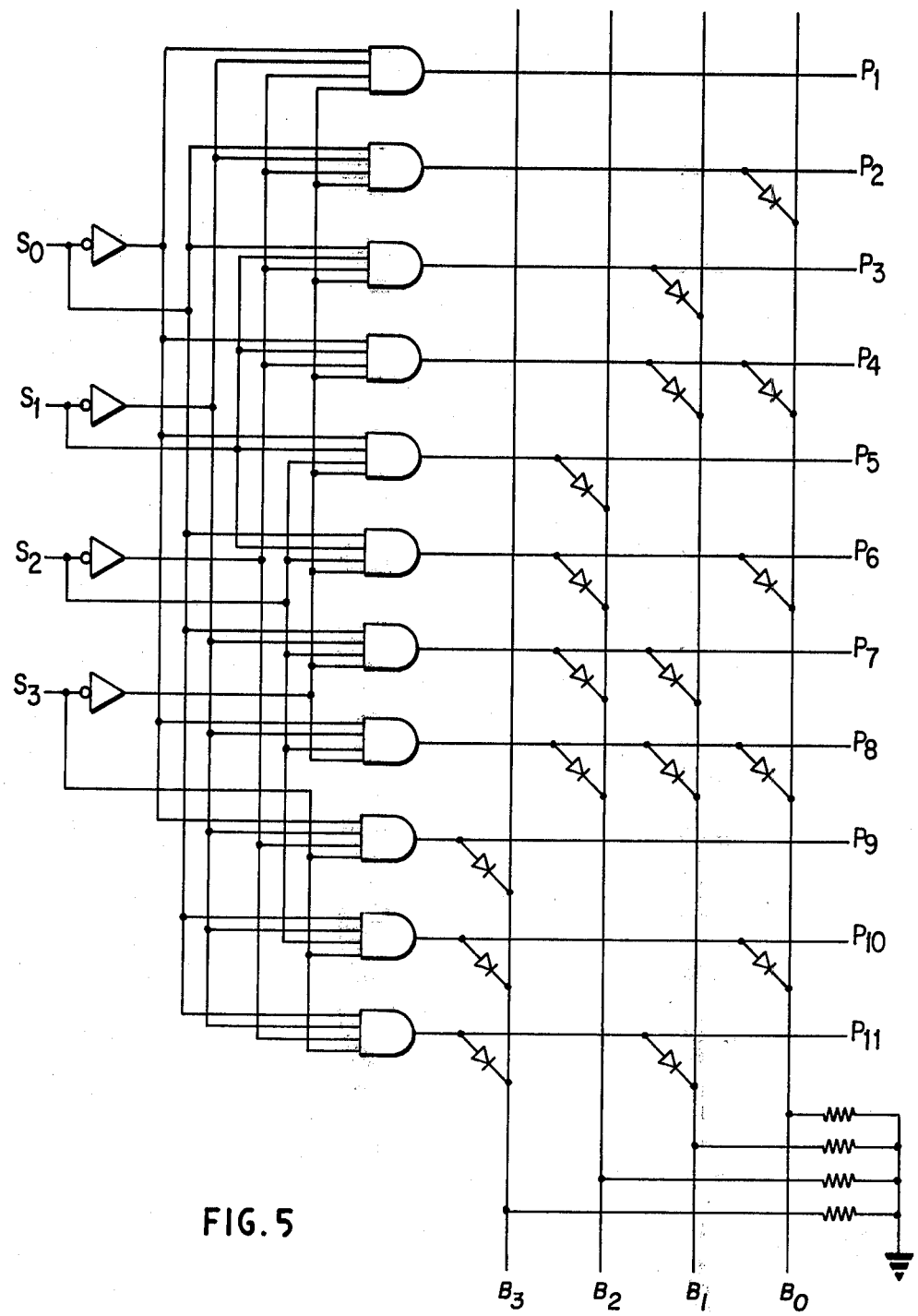
FIG. 5 is a logic circuit of the combination of the switch contact-to-bit pattern converter employed in the embodiment of the present invention shown in FIG. 1.

In the particular embodiment depicted in the drawings, it is noted that a digital temperature control system as applied to an air-conditioner has been selected to illustrate a preferred application of the invention.

DESCRIPTION OF THE PREFERRED EMBODIMENTS

Referring now to the drawings, wherein like reference numerals designate identical or corresponding parts through the several views, and more particularly to FIG. 1 thereof, it is firstly noted that it should be understood that a digital temperature control system of the present invention includes an analog-to-digital converter AD, a bit pattern-to-digital converter BP and a digital signal comparator DC connected both to the analog-to-digital converter AD and BP.

A thermistor or a temperature sensing element TH is connected to the analog-to-digital converter AD, to which an analog signal detected at thermistor TH is transferred and is converted to a digital signal in a well-knownmanner.

The digital output of the analog-to-digital converter AD is supplied to the digital comparator DC for further data processing.

A plurality of switches, $S_0$, $S_1$, $S_2$ and $S_3$ are attached to the bit pattern-to-digital comparator BP, where the desired temperature is given in the form of one of the combinations of the switch contacts, and is stored as digital data after the switch pattern-to-bit pattern conversion by the bit pattern-to-digital comparator BP.

The bit pattern-to-digital comparator BP, in addition to transforming the switch combination into the corresponding bit pattern, either transmits a digital bit pattern to the digital comparator DC, or transmits a digital signal by the least single signal bit smaller than the one determined by the switch combination, depending on the comparison result of the digital comparator DC.

When the digital comparator DC output shows that the A input from the analog-to-digital convertor AD is equal to or less than the B input from the bit pattern-to-digital converter BP, BP continues to supply DC with the same digital signal. However, if the A input is larger than the B input, which means that the room temperature is still unsatisfactorily higher than the desired one, the BP, with the control signal from the DC, decreases the signal to the level one least signal bit below the previous one.

Accordingly the digital comparator DC is so designed that it will deliver a control signal only when the A input is greater than the B input.

With reference to the FIG. 2, the function of the present temperature control system is explained. The fluctuation of the temperature in a room under air-conditioning control is shown in FIG. 2(a), in which two lines limiting the temperature undulations are representative of the acceptable temperature range determined by the machine user.

When the temperature reaches the upper limit at $T_1$ the A input elevates to a higher level than the B input to DC, and then the digital comparator DC, after comparing the two inputs, gives the A>B control signal.

On receipt of the feedback control signal from the digital comparator DC, the bit pattern-to-digital converter that provides the DC, in return, with a new lowered B input at $T_2$ sh own in FIG. 2(b).

In this embodiment the air-conditioner starts to operate as soon as the DC gives A>B control signal.

As the air-conditioner continues operation the temperature decreases with time and crosses the higher limit back into the desired temperature zone at $T_3$.

At this time the thermister, in response to the temperature decrease, lowers the A input to the original level. However, as the B input has been lowered to the lower level, the DC output remains unchanged.

Consequently, the air-conditioner keeps on cooling the space as long as the DC output shows A>B.

As the result of the cooling operation the temperature falls below the lower limit, when the A input becomes a low level signal.

Immediately after the A input drops, the digital levels of the A input and the B input become equal at $T_5$ resulting in the DC output A=B, thus DC no longer generates a control signal.

With the disappearance of the control signal the air-conditioner suspends the cooling function.

It should be understood that the room temperature is thus governed and kept within the preset temperature range.

When there is a change in the desired temperature as shown in FIG. 2 where the desired temperature is by two least signal bits lower than the previous one, the air-conditioner continues functioning to bring down the temperature, and the A input accordingly decreases bit by bit until it reaches and crosses the lower boundary of the newly arranged region.

In FIG. 3, which shows the relation between the switch combinations and the desired temperatures, the switch combinations are so arranged that each differs in the number of contacts by a single contact from adjoining ones. The position of 27° C., for example, has three switching connections with $S_0$, $S_1$ and $S_2$, while the adjacent positions of 26° C. and 28° C. both have two switching contacts.

It can be understood that a single contact decrease or increase will give the system a very stable contact shifting characteristic.

According to this invention the lowest temperature to be set is limited to 22° C. At this position all the switches are open and the air-conditioner can achieve peak cooling. This means that in case all the contacts are released due to contact faults or any contact troubles the air-conditioner can be operated at utmost cooling capacity without suspension of operation.

Referring now to FIG. 4 the analog-to-digital converter AD shown in FIG. 1 is detailed. The AD converts an analog signal from the thermister TH into a four-bit binary code $A_0$, $A_1$, $A_2$ and $A_3$.

In this analog-to-digital converter, there is provided an oscillator OSC and a binary counter COU connected to the oscillator OSC. The counter COU is connected to a register REG. A set of four signal lines joins the counter COU to the register REG. Relatively valued resistors R, 2R, 4R and 8R are attached to each line to keep proportional voltages from the ground.

An analog input is supplied to an analog comparator ACO to which the ground signal is sent and then compared.

The output of analog comparator ACO is supplied to the register REG and converted into a set of digital signals A0, A1, A2, and A3. As a result, digital signals approximately proportional to an analog data input can be obtained.

In FIG. 5 is shown a switch combination-to-bit pattern converter. The switch combination of $S_0$-$S_3$, selected from among the patterns presented in FIG. 3, sends high level signals and chooses one of the eleven patterns $P_1$-$P_{11}$.

Each pattern gives contacts to some of the four signal lines, thereby selecting a digital bit pattern composed of $B_0$, $B_1$, $B_2$ and $B_3$. Also in this case $B_0$-$B_3$ have proportionally weighed resistors.

Figure 6:
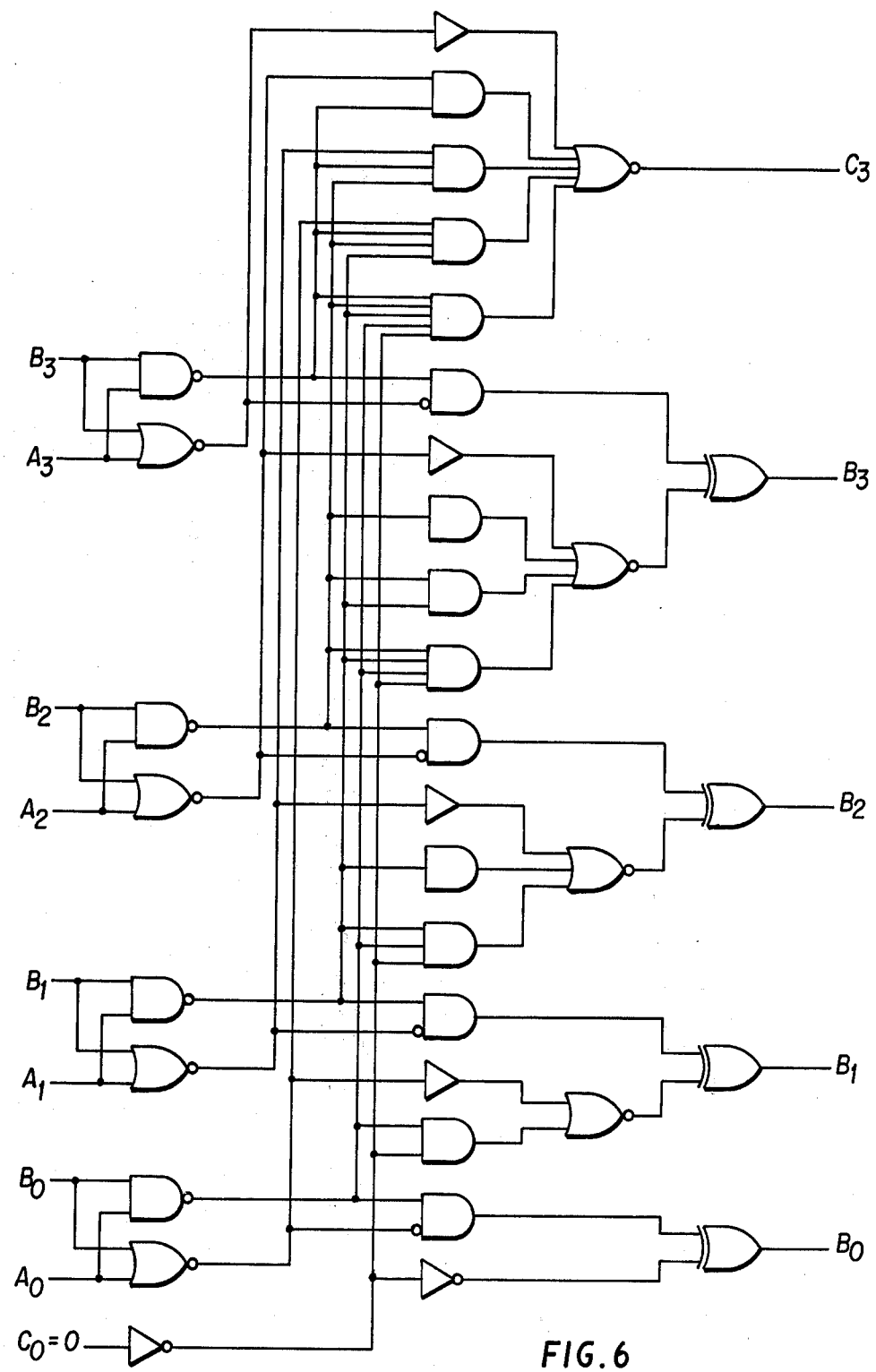
FIG. 6 is a logic circuit of the subtractor of the bit pattern-to-digital converter employed in the embodiment of the present invention shown in FIG. 1.

In FIG. 6 is shown the subtraction logic to be employed in the bit pattern-to-digital converter BP. With this logical circuit, upon receipt of the A>B output from the digital comparator DC, high level inputs are applied to all the Ai ports, $A_0$, $A_1$, $A_2$ and $A_3$, and the resultant combination of $B_0$ to $B_3$ is by one signal digit lower than the input Bi combination.

On the other hand, if the digital comparator DC outputs $A \leq B$, then no signals or low level signals are applied to Ai ports, thereby reproducing the same Bi combination.

Figure 7:
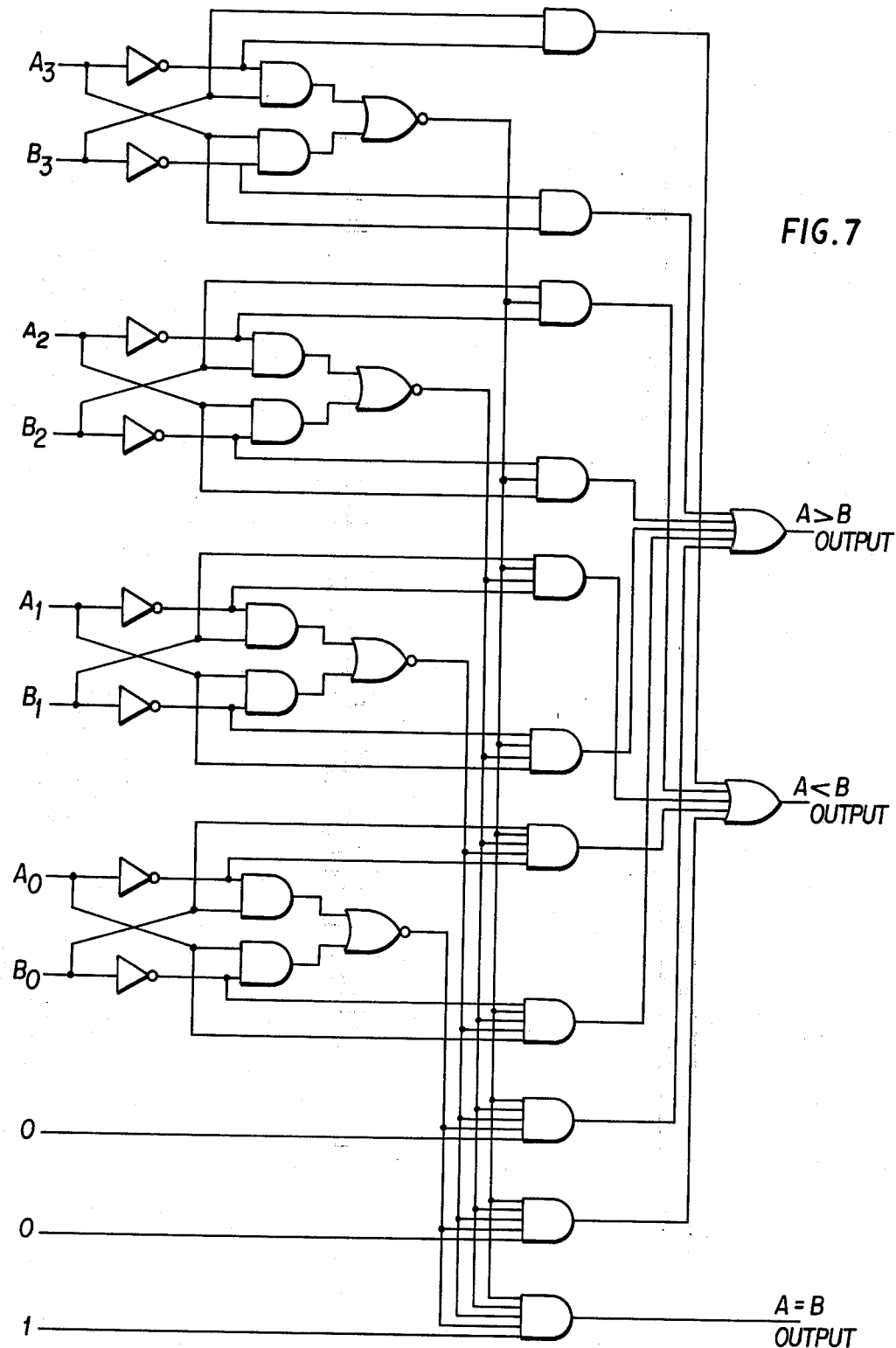
FIG. 7 is a logic circuit of the digital comparator employed in the embodiment of the present invention shown in FIG. 1.

In FIG. 7 the digital comparator DC of FIG. 3 is illustrated, where Ai and Bi inputs correspond respectively to the analog-to-digital comparator AD outputs and the bit pattern-to-digital converter BP outputs.

When the A>B output level is high, this control signal is transmitted to the air-conditioner and at the same time to the bit pattern-to-digital converter BP.

As is seen from the aforementioned teachings since the data is digitally processed, the possibility of resulting temperature deviation is very remote, while deterioration of the circuit elements causes less malfunctioning and control troubles, and the expected life of the whole system is considerably lengthened.

Obviously numerous modification and variations of the present invention are possible in light of the above teachings. It is therefore to be understood that within the scope of the appended claims the invention may be practiced otherwise than as specifically described.

What is claimed as new and desired to be secured by Letters Patent of the United States is:

1. A digital temperature control system for controlling the temperature of a space, comprising:
    a thermal sensing element for detecting the temperature of the space and for supplying an analog signal proportional thereto,
    an analog-to-digital converter for converting an analog signal supplied by said thermal sensing element into a digital output, a temperature setting device for setting a desired temperature, including a plurality of switches indicative of a desired temperature setting, a bit pattern-to-digital converter including first means for converting the switch settings into respective sets of digital signals, and second means under the control of a control signal for arithmetically subtracting a predetermined value from the digital numbers represented by said respective sets of digital signals, said bit pattern-to-digital converter generating an output indicative of either said respective set of digital signals or said respective set of digital signals in which said predetermined value is arithmetically subtracted in dependence on the state of said control signal, and a digital comparator for comparing the digital output from said analog-to-digital converter with the output from said bit pattern-to-digital converter and for generating and transmitting said control signal only in case the digital output from said analog-to-digital converter is greater than the digital output from said bit pattern-to-digital converter, said control signal adapted for use in connection with a means for changing the temperature of said space to cause said temperature changing means to change the temperature of said space in dependence on the state of said control signal.

2. A digital temperature control system as set forth in claim 1, in which the plurality of switches of said temperature setting device are arranged in a plurality of switch combinations, each combination differing from an adjoining combination by the closing of no more than one additional switch.

3. A digital temperature control system as set forth in claim 1, in which the lowest desired temperature of said temperature setting device corresponds to the open contact positions of all the switches of the temperature setting device.

4. A digital temperature control system for controlling the temperature of a space, comprising:

a thermal sensing element for detecting the temperature of the space and for supplying an analog signal proportional thereto, an analog-to-digital converter for converting an analog signal supplied to said thermal sensing element into a digital output, a temperature setting device for setting a desired temperature, including a plurality of switches indicative of a desired temperature setting, a bit pattern-to-digital converter including first means for converting the switch settings into respective sets of digital signals, and second means under the control of a control signal for arithmetically modifying the digital numbers represented by said respective sets of digital signals by a predetermined value, said bit pattern-to-digital converter generating an output indicative of either said respective set of digital signals or said respective set of digital signals arithmetically modified by said predetermined value in dependence on the state of said control signal, and a digital comparator for comparing the digital output from said analog-to-digital converter with the output from said bit pattern-to-digital converter and for generating and transmitting said control signal only in case the digital output from said analog-to-digital converter assumes a predetermined relationship with respect to the digital output from said bit pattern-to-digital converter, said control signal adapted for use in connection with a means for changing the temperature of said space to cause said temperature changing means to change the temperature of said space in dependence on the state of said control signal.

5. A digital temperature control system as set forth in claim 1 or claim 4 wherein said predetermined value is a selected multiple of an amount corresponding to the least significant bit of said set of digital signals.

* * * * *